United States Patent Office 2,913,865
Patented Nov. 24, 1959

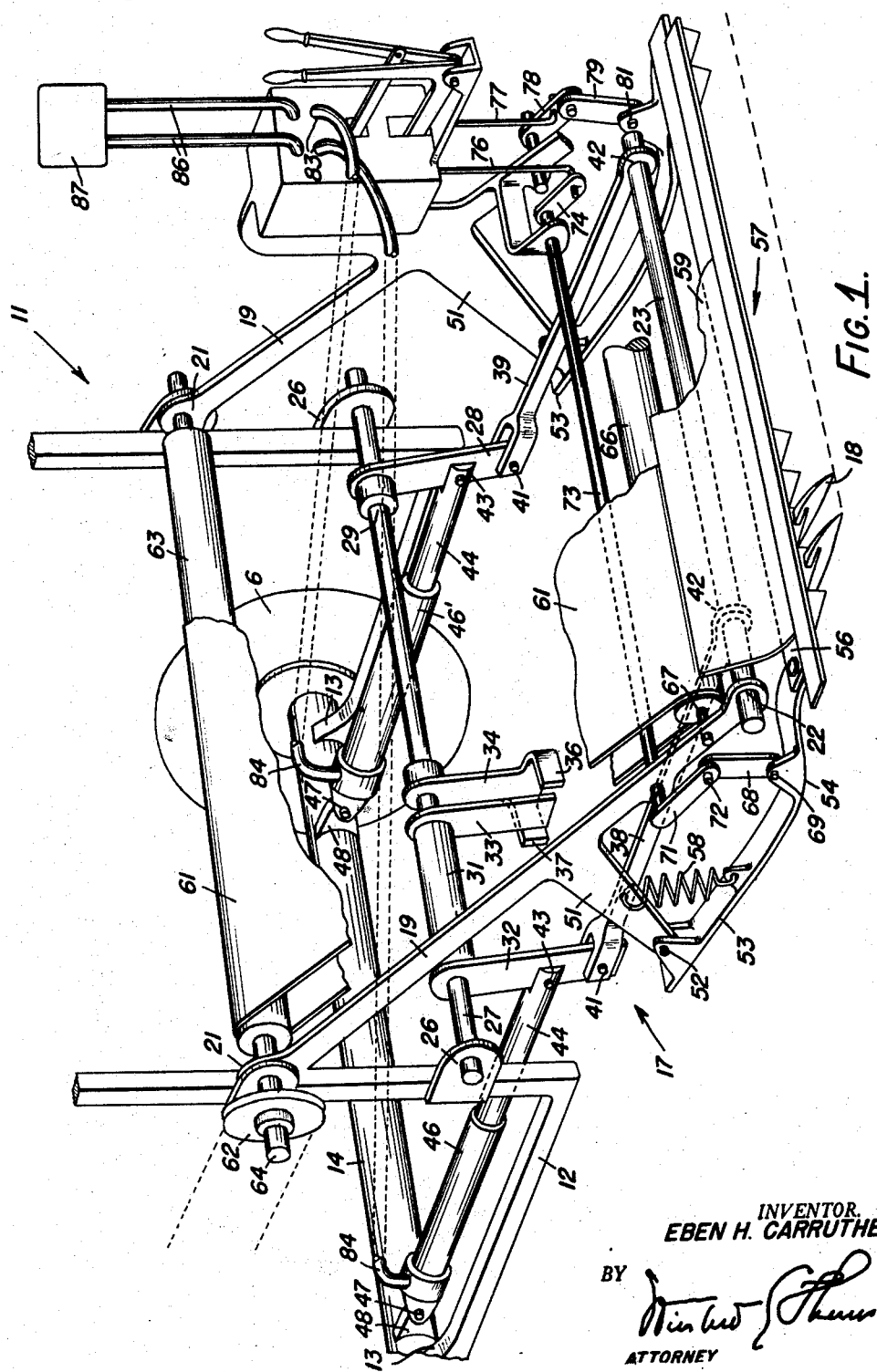

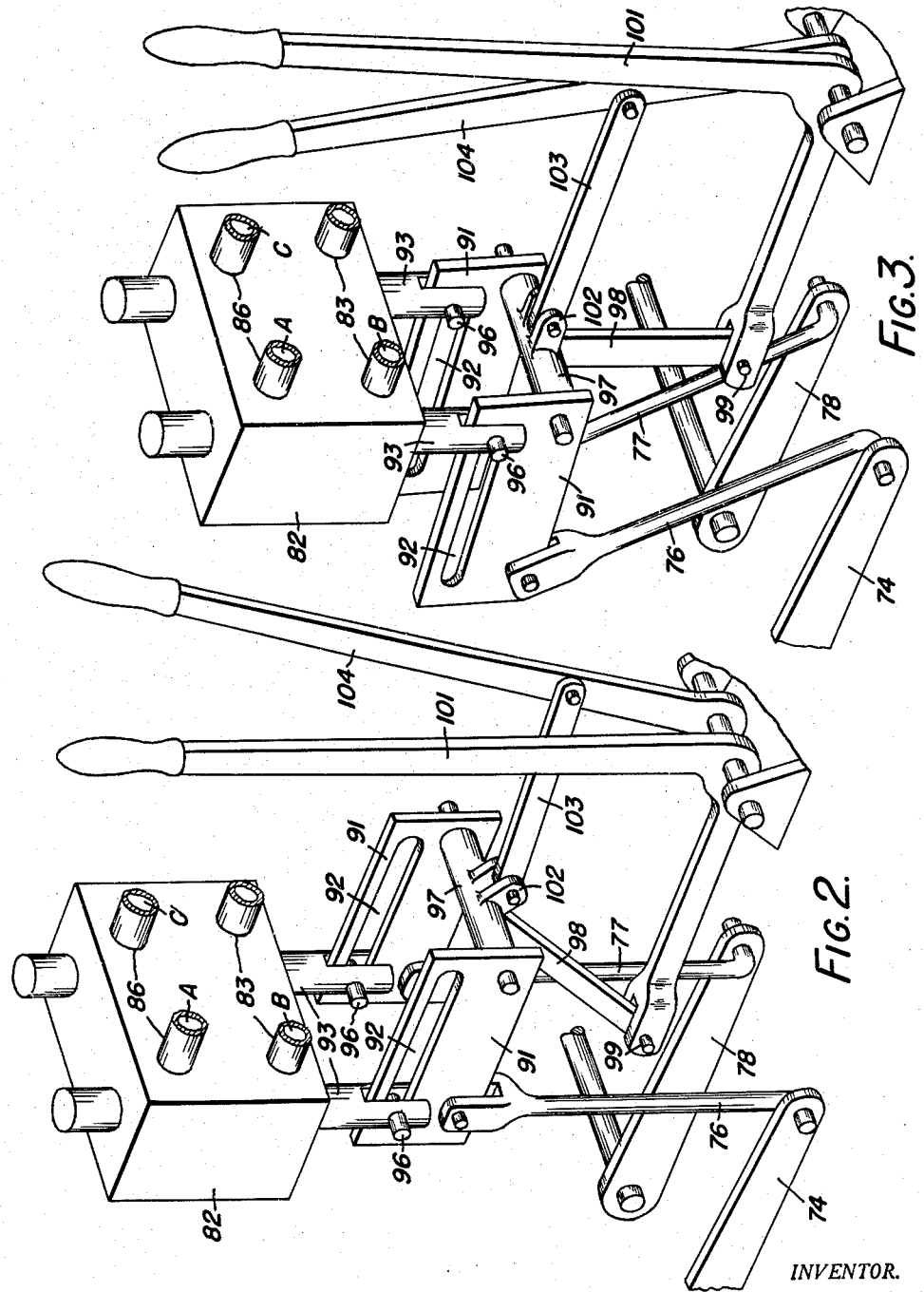

2,913,865
AUTOMATIC LEVELING MECHANISM FOR HARVESTING MACHINE

Eben H. Carruthers, Warrenton, Oreg.

Application August 17, 1956, Serial No. 604,641

9 Claims. (Cl. 56—209)

My invention relates to an automatic leveling device for a harvesting machine, earth moving or digging machine.

One of the problems encountered in connection with machines which travel over the ground for the purpose of tilling the soil, harvesting crops, or otherwise performing a function in connection with the land is that the machine does not always encounter level terrain. The wheels or tractor treads may be passing over land at one level while the part doing the useful work, such as a sickle bar, may be encountering land at, for example, a higher lever. Under such conditions the operator must constantly adjust the level of the sickle bar to the level at which he desires to cut. The same problem is encountered whether the tool doing the useful work is a sickle bar, a tillage implement or rooting attachment. When, for example, a sickle bar is mounted on a tractor or other movable conveyance the sickle bar is carried by a support pivoted on the main frame of the machine. Such support may take the form of an apron over which the product being harvested is conveyed. In the claims the apron or other support for the implement will be called an apron and the cutting means whether it is a sickle bar, rooting or digging implement or other device will be termed "cutting means" or "removing means" but it will be understood that these terms are to be broadly construed to cover, respectively, any kind of implement support or any kind of implement for performing operations on the ground or upon vegetables growing on or in the ground.

While the machine of my invention has application to many types of machinery adapted to move over the ground for the purpose of harvesting crops, tilling or otherwise conditioning the soil, it has been primarily designed in connection with the development of the pea harvesting machine shown in my issued Patent No. 2,763,114, entitled "Method of Harvesting and Separating Pod Type Vegetables." The invention for this reason will be described for use in connection with a pea harvester but the principles of the invention may be applied broadly as stated above.

In a pea harvester such as shown in the above mentioned application, the stems of the peas as they grow in the fields are cut preferably a couple of inches above the ground level by means of a sickle bar. A reel or other means is employed to convey the vines, stems, leaves and pods in a relatively loose mass to an apron over which the material is urged to the processing part of the machine. The stems should be cut at a point close to the ground. Should a rise in the ground level be encountered unless the sickle bar is raised it may dig into the ground with possible damage to the sickle bar or at least failure to cut the vines at the proper level. Likewise difficulties are encountered if the ground level drops. Heretofore, in the operation of sickle type harvesters, the operator raised or lowered the apron and with it the sickle bar by means of a hand crank. This is difficult to do because when the material is being conveyed up the apron, the operator's vision is obscured and he cannot always see a change in the ground level in time to make an adjustment of the level of the sickle bar.

An object of my invention is to provide a machine of the character described in which a cutting means is carried at the forward end of the machine adapted to be propelled through the fields in which the cutting means is supported in such manner that it may pivot upward or downward on the main frame or "float" and means are provided for "feeling" the ground level and automatically raising or lowering the sickle bar in accordance with the level of the terrain being encountered.

Another object of my invention is to provide a vehicle, preferably self-propelled, which may be passed through the fields and is provided with cutting means arranged at its forward end which is so supported and arranged that the frame or apron which carries the cutting means may rise or fall automatically and, if necessary, at least to some extent, warp so as to automatically allow the sickle bar to adjust itself if the ground level on one side or other of the machine raises or lowers.

A further object of my invention is to provide a supporting structure pivoted to the forward end of a movable conveyance adapted to carry cutting means, the cutting means being connected to elements which ride upon the ground and "feel" the level thereof, the ground riding elements being connected to the supporting structure and to a fluid or hydraulic control system in such manner that when the "feeling" elements detect a change in the ground level the fluid control system is actuated to adjust the position of the supporting structure and thereby the cutting means automatically to the change in ground level.

My invention further contemplates a preferably self-propelled machine which has cutting means at its forward end carried by a supporting structure or apron, the supporting structure or apron including means responsive to the unevenness of the terrain to raise or lower the apron automatically or tilt the apron on one side or the other to adjust the position of the cutting means automatically to the terrain, the machine being equipped with a fluid or hydraulic system so constructed that the adjustments to the unevenness of the terrain are automatically made, the machine being further so arranged that it may be selectively controlled either automatically or manually to permit raising the apron, together with the cutting means, clear above the ground level to enable the machine to pass over highways or through rough fields.

Other objects and advantages of my invention will be particularly set forth in the claims and will be apparent from the following description when taken in connection with the accompanying drawings, in which:

Fig. 1 is a perspective view of the cutting means and supporting structure therefor and showing how it is carried by the main frame of the machine parts being broken away and in section better to illustrate the invention;

Fig. 2 is an enlarged perspective view with some parts in section showing a part of the hydraulic system and the hand controls therefor with the hand controls in position for automatic control; and Fig. 3 is a view similar to Fig. 2 with the parts in the position they occupy when the machine is under manual control to permit raising of the cutting means clear of the ground.

In Fig. 1, I have shown part of the main frame which is indicated as a whole by the numeral 11. It includes a pair of structural shapes 12 rigidly secured, as shown at 13, to a tubular housing 14 which encloses the axle (not shown) for wheels 6. It will be understood that the vehicle includes at least an additional pair of wheels (not shown), a motor for driving the wheels and thereby the vehicle through the fields and means carried by the main frame for processing the material being harvested or for loading the materials into trucks traveling through the fields adjacent the harvesting machine. While a wheeled self-propelled vehicle is indicated, my invention may be applied to a tractor or non-self propelled vehicle.

The main frame 11 carries at its forward end a supporting structure or what may be termed an apron or header generally indicated by the numeral 17. The term header will, for the most part, be used in the claims to describe the supporting structure which carries the cutting, cultivating or digging element or implement, in this case a sickle bar indicated by the numeral 18.

The apron or header 17 includes a pair of side frames 19 which are pivotally supported in trunnions 21 carried by the main frame 11. At their lower ends the side frames are non-rigidly connected at 22 to a cross-member 23. This basic part of the apron or supporting structure, that is the side frames 19 and the cross-member 23 may swing upward and downward about the trunnions 21. Moreover, as will presently appear, this basic structure may twist or warp, at least to a limited extent, about the connections 22 to permit, for example, the left hand side of this basic apron structure to raise or lower with respect to the right hand side thereof, as viewed in Fig. 1.

Welded to the main frame is a pair of supports 26 in which a shaft 27 is rotatably supported. A torque arm 28 is keyed, as indicated at 29, to the shaft 27. A torque tube 31 is mounted on the shaft 27 adjacent the other side of the machine and is free to rotate with respect to the shaft. Rigidly secured to the torque tube 31 and thus free to rotate with respect to the shaft 27 are a pair of torque arms 32 and 33. Rigidly secured to the shaft 27 is another torque arm 34 which has stops 36 and 37 between which the torque arm 33 is free to shift to engage either of the stops 36 and 37 as will presently appear.

Connecting rods 38 and 39 are pivoted at 41 respectively to torque arms 32 and 28. The forward end of the connecting rods 38 and 39 are pivoted to the crossbar 23, as indicated at 42. Pivoted to the torque arms 28 and 32, as indicated at 43, are the piston rods 44 of hydraulic actuators or fluid cylinders 46 and 46'. The inner ends of the cylinders are pivoted, as indicated at 47, to support pieces 48 rigidly secured to the tubular member 14.

It will now be clear that pressure applied to both cylinders will raise the apron. Moreover, pressure applied to either cylinder 46 or 46' will actuate its corresponding piston rod 44 and will tend to raise the corresponding side of the supporting structure or apron 17. However, if, for example, the left side of the apron is raised more than an amount which brings torque arm 33 into engagement with stop 36 then, after such engagement, both sides of the apron will be raised simultaneously. A similar result will occur if shaft 27 is rotated by reason of a raising of the right hand side of the apron upon actuation by the right hand piston 44. This will cause stop 37, after an initial raising of the right side of the frame, to engage torque arm 33 which will cause the left hand side of the apron to rise simultaneously with the right hand side of the apron. A similar but opposite result will occur if pressure is released at a greater rate from one cylinder than the other.

While primarily the mechanism shown is for the purpose of raising or lowering of the apron as a whole automatically to adjust the level at which the cutting means or sickle bar will operate, a limited amount of warping of the apron is provided for to enable one side or the other of the sickle bar to raise or lower with respect to the other, to a limited extent, in case one side or the other of the sickle bar is encountering a mound or depression. A limited amount of warping of the apron will occur before either the stop 36 or the stop 37 is engaged by the torque arm 33. After either stop is engaged by the torque arm 33, both sides of the apron will be raised or lowered simultaneously.

The side frames or support bars 19 have depending arms 51 to which are pivoted, as indicated at 52, the rearward portions of skids or shoes 53. The skids or shoes "feel" and are sensitive to the level of the ground and, in a manner which will presently appear, apply or release pressure from either or both of the fluid cylinders. It will, of course, be apparent that wheels may be substituted for the skids or shoes and it is intended that the term "shoes" when found in the claims will include wheels within its scope. The shoes 53 engage the ground, as indicated at 54, and are, in this instance, turned inward at their forward ends and rigidly secured to a cross bar 56. The cross bar 56 carries supporting structure, generally indicated by the numeral 57, which carries the sickle 18. From what has been previously stated it will be understood that other mechanism or other implements may be employed instead of a sickle. Sickles and supports and drives therefor are well known in the art to which this invention applies and they, therefore, have not been shown.

With the hydraulic cylinders carrying the supporting frame or apron adjusted to provide the appropriate level for cutting, the shoes will ride on the ground and maintain the sickle 18 at correct cutting level. The shoes may be made to ride more lightly on the ground by means of spring 58, only one of which is shown connected between the shoes 53 and the arms 51.

The vines cut by the sickle bar are raked up a ramp 59 by a reel or other means (not shown) since it constitutes no part of my present invention. The vines are delivered to a conveyor or draper belt 61 which conveys them to the processing part of the harvester mounted on the main frame of the machine. The draper belt is driven from the main drive of the harvester, by a pulley 62 fixed to a shaft 64, the draper belt passing over a drive roll 63 rigidly secured to the shaft 64. The other end of the draper belt passes over an idler roll 66 freely rotatable on a shaft 67 carried by the side frames or bars 19.

With further reference to Fig. 1, a link 68 is pivoted at 69 to the shoe 53 at the left of the machine, the other end of the link 68 being pivoted to a crank 71 at 72. The crank is rigid with a cross rod 73. The cross rod 73 extends loosely through the bar 19 at the left of Fig. 1 and at its other end is rigidly connected to a crank 74 the end of which is pivoted to a control rod 76. A control rod 77 is connected by a similar linkage, as by crank 78, mounted on the right hand side frame 19. The crank 78 is pivotally connected to a link 79 pivoted, as indicated at 81, to the shoe 53 at the right of Fig. 1. The crank 78 is supported from a short shaft 80 carried by the right hand bar 19 (Fig. 1).

It will now be apparent that if either shoe 53 is lowered with respect to the apron 17, its respective control rod 76 or 77 is drawn downward. A corresponding but opposite movement of the control rods 76 and 77 occurs if either shoe is raised. The two control rods 76 and 77 are, therefore, operated independently by their respective shoes 53 and are not in themselves interconnected. However, they are interconnected indirectly by the arrangement of torque arms 33 and 34 and stops 36 and 37 and their related parts as previously described.

Referring now to Figs. 2 and 3, the numeral 82 indicates a hydraulic or fluid control valve block. The construction of the valves and the valve block need not be described in detail because such valves are well known in the art. Each of the control rods 76 and 77 operates a separate valve in a bank of two valves. The valves are connected through connections 83 to fluid lines 84 which extend to the hydraulic cylinders 46 and 46'. Lines 86 from the valves are connected to a source of hydraulic pressure such as a pump 87, a sump (not shown) being included in the system.

If the shoes on each side of the machine engage a rise in the ground level both rods 76 and 77 will be pushed upward, opening the valves in the valve block and connecting both cylinders 46 and 46′ to the pump. The apron and with it the sickle bar will then rise. If the shoes ride into a depression, the control rods will move downward to connect the cylinders 46 and 46′ to the sump and permit the apron together with the sickle bar to lower.

If now, for example, shoe 53 at the left of Fig. 1 rises due to a rise in the ground level over which the skid 53 at the left is traveling the control rod 76 will be pushed upward to position the hydraulic valve so that oil under the pump pressure will be admitted to the cylinder 46. Piston 44 of the cylinder 46 will then be extended and through the torque arm 32 and the connecting rod 38, the corresponding side of the apron 17 will be raised. If, however, the rise in the ground level under the shoe 53, at the left of Fig. 1, is such that excessive twisting will be imparted to the apron, torque arm 33 will engage the stop 36 and shift the torque arm 34 in the same direction as the torque arm 33 is moving. This action through the torque arm 28, connecting rod 39, link 79 and crank 78 raises the control rod 77 to allow oil to flow to the hydraulic cylinder 46¹ thus raising the right side of the apron, as viewed in Fig. 1.

Thus the mechanism shown allows for irregularities in the ground level. If the irregularity is excessive, after some twisting of the apron, both sides of the apron will, thereafter, be raised together. The same but reverse action, allowing leakage of oil from the cylinders 46 and 46¹, occurs if either or both shoes are lowered as a result of either or both of the skids moving into a depression in the ground. In other words, each side of the apron will independently adjust itself according to the ground conditions over which its respective shoe 53 is traveling within the allowable twist limits of the apron. However, beyond this limit, as determined by the distance between the stops 36 and 37, the level of the apron as a whole will rise. The apron will then be under the control of the shoe riding on the highest ground.

The pump 87, the valve block 82, the cylinders 46, 46′, the pistons 44 and the lines leading from the control block, together with appurtenances thereto, constitute a hydraulic or fluid system for controlling the operation of the header or apron. The hydraulic system also constitutes a power operated means for actuating the header or apron. The rods 76 and 77 control the actuation of the valves in the valve block 82. The rod 76 is actuated by elements 76, 74, 73, 71, 68 and the shoe 53 at the left of Fig. 1. Rod 77 is actuated by elements 78, 79 and the shoe 53 at the right of Fig. 1. It may thus be said that the power operated means or hydraulic system is sensitive to the level at which each of said shoes is riding.

In the operation of a harvester or other machine for performing operations on the soil, it is often desirable to have the raising and lowering of the apron and the harvesting implement or the sickle bar shown herein under manual control. For instance when traveling on the highway or when entering fields over rough ground, the apron should be raised to a high position to give adequate clearance below the sickle bar. In Figs. 2 and 3 I have shown the valve and linkages which allow dual control either automatic or manual of the raising or lowering of the apron.

The control rods 76 and 77 are each pivotally connected to a control plate 91 each of which has an elongated slot 92. The valve actuating rods 93 are forked at their lower ends for the reception of pins 96 adapted to shift in the slots 92. The forward end of the control plates 91 pivotally receive a cross member 97 which is rigidly connected to a bar 98 pivoted at 99 to a crank shaped hand control lever 101. The cross member 97 has a bifurcated part 102 for the reception of a pivot or link 103 pivotally connected to a hand control lever 104.

When the control lever 104 is in the position shown in Fig. 2, that is with the control plates 91 drawn to the right, as shown in Fig. 2, the harvesting machine is under automatic control. When the lever 104 is pushed to the position shown in Fig. 3, operation of the control rods 76 and 77 have no effect on the valve stems 93 since the control plates 91 merely pivot about the pins 96. Raising and lowering of the apron as a whole is then under the control of the manual lever 101 operation of which will raise or lower the valve stems 93.

It is believed that an illustration of the hydraulic valves is unnecessary since such valves and hydraulic systems are well known in the art. It is sufficient to state that, for example, when an upward movement of the control rod 76 occurs, valve stem 93 will be placed in a position whereby oil from the oil pump 87 will enter at A which is then connected to outlet B by reason of the raising of the valve stem 93. B is connected, by the hydraulic connection 84, to the hydraulic cylinder 46 thus causing a raising of the left side of the apron as viewed in Fig. 1. Depression of the valve stem 93 will connect B through the outlet C which is connected to the return line to the oil pump (not shown). Pressure is thus released from the cylinder 46 and the left side of the apron is lowered. Actuation of valve stem 93 at the right of Fig. 2 has a like effect on the hydraulic cylinder 46¹. When the control lever 104 is in the position shown in Fig. 2 manual control lever 101 is out of control of the valve stem. When the lever 104 is in the position of Fig. 3, the linkage is shifted so that the hand control 101 is in a position to control the valves and will actuate both valves simultaneously to, for example, allow oil to flow to both cylinders and thus raise the apron and the shoes and sickle bar clear of the ground to permit rapid travel over rough ground or over the highway.

While I have shown and described the preferred form of my invention, it will be apparent that various changes and modifications may be made therein, particularly in the form and relation of parts, without departing from the spirit of my invention as set forth in the appended claims.

I claim:

1. A harvesting machine comprising, in combination, a mobile frame, a forwardly extending header frame pivotally attached to said mobile frame, cutting means flexibly attached to said mobile frame and having shoe means adapted to slide along the ground, power lift means attached to said mobile frame and header frame for controlling the elevation of said header frame, and actuating means operatively connected to said power lift means, said actuating means being interposed between said cutting means and header frame for maintaining said header frame at a predetermined distance from the ground.

2. A harvesting machine as claimed in claim 1 wherein said power lift means comprises a hydraulic cylinder element having a movable piston element, one of said elements being attached to said mobile frame and the other said element being attached to said header frame.

3. A harvesting machine as claimed in claim 2 wherein said actuating means comprises linkage means connecting said cutter means and said header frame, and hydraulic valve means, said hydraulic valve means being operatively connected to said linkage means.

4. A harvesting machine as claimed in claim 2 wherein said actuating means comprises hydraulic valve means which include a dual control therefor, one of said controls enabling the automatic functioning of said hydraulic system and the other manual control thereof.

5. A harvesting machine as claimed in claim 2 in which means are provided for discontinuing the operation of said actuating means when it is desired to render said cutting means inactive and means including a manually operated control for said hydraulic cylinder element for raising said header frame and cutting means clear of the ground when it is desired to transport the machine from one location to another.

6. A harvesting machine comprising, in combination, a mobile frame, a forwardly extending header frame pivotally attached to said mobile frame, power lift means intercommunicating with said mobile frame and header frame for controlling the elevation of said header frame, feeler means pivotally attached to said header frame and adapted to ride along the ground while maintaining substantial contact therewith, and actuating means operatively connecting said feeler means to said power lift means, whereby said power lift means maintains said header frame at a predetermined distance from the ground.

7. A harvesting machine comprising, in combination, a mobile frame, a forwardly extending header frame pivotally attached to said mobile frame, a pair of transversely spaced shoe means adapted to slide along the ground, cutting means mounted on said shoe means, power lift means attached to said mobile frame and header frame for controlling the elevation of said header frame, said power lift means comprising two independently controlled hydraulic cylinders, one connected to each side of said header frame, and actuating means operatively connected to each of said power lift means, one of said actuating means being interposed between each of said transversely spaced shoes and said header frame for independently maintaining each side of said header frame at a predetermined distance from the ground.

8. A harvesting machine comprising, in combination, a mobile frame, a forwardly extending header frame pivoted to said mobile frame, said header frame being provided with loose pivotal connections permitting limited twisting movement thereof, power lift means interconnecting each side of said header frame with said mobile frame, control means operatively connected to said power lift means, ground engaging feeler means on each side of the forward end portion of said header frame and actuating means operatively connecting each of said feeler means and adjacent control means, whereby when a feeler means engages a ground unevenness on either side of said machine, that side of the header frame will be vertically adjusted.

9. A harvesting machine as claimed in claim 8 wherein said control means are operatively interconnected to limit the difference in vertical adjustment between the sides of the header to a predetermined value.

References Cited in the file of this patent

UNITED STATES PATENTS

| | | |
|---|---|---|
| 2,589,553 | Kesselring | Mar. 18, 1952 |
| 2,700,265 | Speith et al. | Jan. 25, 1955 |
| 2,709,329 | Neal | May 31, 1955 |
| 2,750,727 | Wright | June 19, 1956 |